United States Patent
Lim et al.

(10) Patent No.: US 11,091,570 B2
(45) Date of Patent: Aug. 17, 2021

(54) METHOD FOR PREPARING VINYL CHLORIDE-BASED POLYMER

(71) Applicant: LG CHEM, LTD., Seoul (KR)

(72) Inventors: Joong Chul Lim, Daejeon (KR); Hyun Kyou Ha, Daejeon (KR); Yang Jun Jeon, Daejeon (KR); Min Jeong Kang, Daejeon (KR)

(73) Assignee: LG CHEM, LTD., Seoul (KR)

( * ) Notice: Subject to any disclaimer, the term of this patent is extended or adjusted under 35 U.S.C. 154(b) by 258 days.

(21) Appl. No.: 16/308,143

(22) PCT Filed: Aug. 31, 2017

(86) PCT No.: PCT/KR2017/009565
§ 371 (c)(1),
(2) Date: Apr. 1, 2019

(87) PCT Pub. No.: WO2018/056604
PCT Pub. Date: Mar. 29, 2018

(65) Prior Publication Data
US 2020/0181298 A1    Jun. 11, 2020

(30) Foreign Application Priority Data

Sep. 26, 2016 (KR) ........................ 10-2016-0122964

(51) Int. Cl.
*C08F 14/06*    (2006.01)

(52) U.S. Cl.
CPC .......... *C08F 14/06* (2013.01); *C08F 2400/02* (2013.01)

(58) Field of Classification Search
None
See application file for complete search history.

(56) References Cited

U.S. PATENT DOCUMENTS

| | | | |
|---|---|---|---|
| 4,464,517 A * | 8/1984 | Makino | B01J 19/2465 422/138 |
| 4,481,333 A | 11/1984 | Fleischer et al. | |
| 4,739,023 A | 4/1988 | Lee et al. | |
| 4,954,595 A | 9/1990 | Amano et al. | |
| 5,036,124 A | 7/1991 | Igarashi et al. | |
| 5,789,499 A | 8/1998 | Masuko et al. | |
| 10,407,569 B2 | 9/2019 | Ahn et al. | |
| 2005/0143481 A1 | 6/2005 | Imai et al. | |
| 2016/0137827 A1 | 5/2016 | Ahn et al. | |

FOREIGN PATENT DOCUMENTS

| | | |
|---|---|---|
| CN | 1114323 A | 1/1996 |
| CN | 103408681 A | 11/2013 |
| CN | 105209540 A | 12/2015 |
| FR | 2604709 A | 4/1988 |
| JP | 06-279510 A | 10/1994 |
| JP | 2004-051846 A | 2/2004 |
| KR | 10-0151133 B1 | 10/1998 |
| KR | 10-0570952 B1 | 4/2006 |
| KR | 10-2013-0051460 A | 5/2013 |
| KR | 10-1303515 B1 | 9/2013 |
| KR | 10-1310540 B1 | 9/2013 |

OTHER PUBLICATIONS

Yang Qiao-ling et al. (2007).Intelligent Control System of Chloroethylene Polyreaction Process. Control and Instruments in Chemical Industry. vol. 2. No. 34.

* cited by examiner

*Primary Examiner* — Richard A Huhn
(74) *Attorney, Agent, or Firm* — Dentons US LLP

(57) ABSTRACT

The present invention relates to a method for preparing vinyl chloride-based polymers, which is provided to improve polymerization productivity. An initial stage polymerization temperature is raised, the temperature is then lowered at a certain cooling rate from the time when an initial target polymerization temperature until a polymerization reaction is completed, and thus, a vinyl chloride-based polymer with excellent physical properties may be prepared while reducing a polymerization time and improving polymerization productivity even without additionally installing a polymerization reactor and heat removal equipment.

11 Claims, No Drawings

METHOD FOR PREPARING VINYL CHLORIDE-BASED POLYMER

TECHNICAL FIELD

Cross-Reference to Related Applications

This application is a National Stage Entry of International Application No. PCT/KR2017/009565 filed on Aug. 31, 2017, and claims the benefit of and priority to Korean Application No. 10-2016-0122964, filed on Sep. 26, 2016, all of which are hereby incorporated by reference in their entirety for all purposes as if fully set forth herein.

TECHNICAL FIELD

The present invention relates to a method for preparing vinyl chloride-based polymers, which is capable of reducing a polymerization time, improving polymerization productivity and preparing a vinyl chloride-based polymer with an excellent physical property.

BACKGROUND ART

Vinyl chloride polymers are inexpensive, have excellent quality balance, and thus have been widely used in a variety of fields, such as fields of hard and soft materials. Specifically, the vinyl chloride polymers have been used for pipes, films, window frames, or the like in the field of hard materials, and have been used for wire coatings, wrap films, sheets, or the like in the field of soft materials.

It is important to improve polymerization productivity per unit volume of a reaction for a method for saving manufacturing costs of the vinyl chloride polymers. Methods for improving such polymerization productivity include: a method in which a polymerization reaction time is constant, and the output per batch is increased by increasing the conversion rate of polymerization; and another method in which a great quantity is produced per unit time by reducing the polymerization reaction time.

In preparing vinyl chloride polymers using suspension polymerization, there is a method for improving polymerization productivity, and in the method, the quantity of an initiator is increased to reduce a reaction time. However, when the quantity of the initiator is increased, there is a limitation in that an explosive reaction is caused, and heat removal in the reaction is limited.

To solve this, there are provided: a method of reducing the polymerization time by increasing heat removal capacity to increase the quantity of an initiator; and a method of increasing a heat removal effect using chilled water instead of cooling water; and the like. However, such methods, had limitations of requiring new installation of heat removal equipment, spending great maintenance costs, thereby being in sufficient to ensuring a stable quality.

DISCLOSURE OF THE INVENTION

Technical Problem

The present invention provides a method for preparing vinyl chloride-based polymers which is capable of improving polymerization productivity and preparing vinyl chloride-based polymers with excellent physical properties even without further installing a polymerization reactor and heat removal equipment.

Technical Solution

The present invention provides a method for preparing vinyl chloride-based polymers which includes: feeding vinyl chloride-based monomers, a polymerization initiator and water into a reactor; raising the internal temperature of the reactor up to an initial target polymerization temperature; and lowering the temperature with a constant cooling rate when the internal temperature of the reactor reaches the initial target polymerization temperature until a polymerization reaction is completed.

Advantageous Effects

According to the present invention, a method for preparing vinyl chloride-based polymers which is capable of prepare vinyl chloride-based polymers with excellent physical properties while reducing a polymerization time and improving polymerization productivity even without further installing a polymerization reactor and heat removal equipment.

MODE FOR CARRYING OUT THE INVENTION

Hereinafter, the present invention will be explained in more detail to assist the understanding of the present invention. Terms or words used in the specification and claims should not be interpreted as limited to a commonly used meaning or a meaning defined dictionaries, and should be interpreted as having a meaning that is consistent with their meaning in the context of the technical idea of the invention, based on the principle that an inventor may properly define the meaning of the words or terms to best explain the invention.

In conventional arts, in general, the polymerization of vinyl chloride-based polymers has been performed through isothermal polymerization in which a constant temperature is maintained while a reaction proceeds. However, due to characteristics of polymerization, heating does not constantly occur during a polymerization time, but there is a time point when heating reaches a maximum within a specific time interval after a middle stage of polymerization. Accordingly, such conventional isothermal polymerization is allowed to proceed while adjusting feeding amounts of a raw material and sub-raw materials with respect to a maximum capacity of a heat removal apparatus, and therefore, had a limitation in improving polymerization productivity.

The present invention relates to a method for preparing vinyl chloride-based polymers which is provided to improve polymerization productivity. By raising an initial polymerization temperature and lowering the polymerization temperature with a constant cooling rate from a time point of reaching an initial target polymerization temperature until a polymerization reaction is completed, heat generated after a middle stage of the polymerization is distributed to an initial stage of the polymerization to thereby reduce the polymerization time and thus, the polymerization productivity may be improved. According to the present invention, the polymerization productivity may be effectively improved even without further installing a polymerization reactor and a heat removal apparatus which are conventionally used for isothermal polymerization, and vinyl chloride-based polymers having physical properties which are the same as or better than those prepared by conventional isothermal polymerization.

Specifically, the present invention includes: 1) feeding vinyl chloride-based monomers, a polymerization initiator and water into a reactor; 2) raising the internal temperature of the reactor up to an initial target polymerization temperature; and 3) lowering the temperature with a constant cooling rate, when the internal temperature of the reactor reaches an initial target polymerization temperature until a polymerization reaction is completed.

The vinyl chloride-based monomers may be a material of only vinyl chloride monomers or a mixture of vinyl chloride monomers and monomers which may be copolymerized with the vinyl chloride monomers (these are totally referred to as vinyl chloride-based monomers).

Monomers which may be copolymerized with vinyl chloride may be, but not limited to, one or more selected from: an olefin compound such as ethylene and propylene; vinyl esters such as vinyl acetate and vinyl propionate; unsaturated nitriles such as acrylonitrile; vinyl alkyl ethers such as vinyl methyl ether and vinyl ethyl ether; and one or more selected from unsaturated fatty acids such as acrylic acid, methacrylic acid, itaconic acid, and maleic acid, and anhydrides thereof. Any monomers which, in general, may be copolymerized with the vinyl chloride monomers may be used.

The polymerization initiators which may be used for the present invention may be: deacylperoxides such as dicumyl peroxide, dipentyl peroxide, di-3,5,5-trimethylhexanoylperoxide, and dilauroylperoxide; peroxydicarbonates such as diisopropylperoxydicarbonate, di-sec-butylperoxydicarbonate, and di-2-ethylhexylperoxydicarbonate; a peroxyesters such as t-butylperoxy neodecanoate, t-butylperoxy neoheptanoate, t-amylperoxy neodecanoate, cumyl peroxyneodecanoate, cumyl peroxyneoheptanoate, 1,1,3,3-tetramethylbutyl peroxyneodecanoate; an azo-based compound such as azobis-2,4-dimethylvaleronitrile; a sulfates such as potassium persulfate or ammonium persulfate; or the like, and any one thereof or a mixture of two or more thereof may be used.

The content of the polymerization initiator may be determined in consideration of polymerization productivity, reaction heat control, and the like, and may be added in a range of 0.03-0.3 parts by weight with respect to 100 parts by weight of the vinyl chloride-based monomer. Meanwhile, although described later, in a polymerization reaction according to an embodiment of the present invention, a large amount of polymerization initiator, which is more than the content of the polymerization initiator added during conventional isothermal polymerization, may be added.

Vinyl chloride-based polymers according to the present invention are prepared by suspension polymerization, and the water may be used as a reaction medium. When the vinyl chloride-based monomers are dispersed in the medium, and the polymerization initiator is decomposed at a certain temperature to thereby form reactable sites, polymerization is carried out such that the sites react with chain ends of the vinyl chloride-based monomers and new vinyl chloride-based monomers continuously adhere to tails of the vinyl chloride-based polymer.

In the present invention, if necessary, a dispersant, a polymerization regulator, a chain transfer agent, a pH regulator, an antioxidant, a crosslinker, an antistatic agent, an anitscaling agent, a surfactant, or the like may be added into the reactor before or after the polymerization reaction, and a portion thereof may be added in a divided manner or continuously added during polymerization.

The vinyl chloride-based monomers, the polymerization initiator, and the water are added into the reactor, and then in step 2), the internal temperature of the reactor is raised up to an initial target polymerization temperature.

The initial target polymerization temperature may be at least a reference temperature of isothermal polymerization according to an average target polymerization degree, and more favorably, may be a high temperature exceeding the isothermal polymerization reference temperature according to the average polymerization degree.

The isothermal polymerization reference temperature is determined according to the average polymerization degree when the vinyl chloride-based polymer is assumed to be prepared by isothermal polymerization, and in the present invention, the isothermal polymerization reference temperature may be in a range of 30-80° C.

The isothermal polymerization reference temperature not only varies slightly according to equipment characteristics and manufacturing companies, but also may not be described in this specification for all the cases of the average target polymerization degree. For example, in several exemplary cases, it is desirable that: when the target average polymerization degree is 800, the isothermal polymerization reference temperature be within a range of 63-65° C.; when the target average polymerization degree is 900, the isothermal polymerization reference temperature be within a range of 60-62° C.; when the target average polymerization degree is 1,000, the isothermal polymerization reference temperature be within a range of 56-58° C.; when the target average polymerization degree is 1,300, the isothermal polymerization reference temperature be within a range of 52-54° C.; and when the target average polymerization degree is 1,700, the isothermal polymerization reference temperature be within a range of 47-49° C.

In a preferred exemplary embodiment of the present invention, the initial target polymerization temperature may be set at a temperature higher than the isothermal polymerization reference temperature according to the average polymerization degree. The decomposition of the polymerization initiator may be promoted during the initial stage of the polymerization by raising the initial target polymerization temperature, and accordingly, heating problem concentrated on the middle stage of polymerization and later may be solved. In addition, since a maximum heating amount in the final stage of the polymerization decreases, an amount of polymerization initiator to be added may be increased, and polymerization productivity may be improved by adding the polymerization initiator in an amount of existing limit value or more.

The initial target polymerization temperature may be a temperature of 1-7° C. higher than the isothermal polymerization reference temperature according to the average polymerization degree. For example, it is desirable that: when the target average polymerization degree is 800, the initial target polymerization temperature be within a range of 66-70° C.; when the target average polymerization degree is 900, the initial target polymerization temperature be within a range of 63-67° C.; when the target average polymerization degree is 1,000, the initial target polymerization temperature be within a range of 59-64° C.; when the target average polymerization degree is 1,300, the initial target polymerization temperature be within a range of 55-61° C.; and when the target average polymerization degree is 1,700, the initial target polymerization temperature be within a range of 50-56° C.

When the initial target polymerization temperature is less than 1° C. higher than the isothermal polymerization reference temperature, an effect of promoting decomposition of the polymerization initiator during the initial stage of the polymerization may be inadequate, and when the initial target polymerization temperature is more than 7° C. higher than the isothermal polymerization reference temperature, an effect of reducing the polymerization time may be inadequate, but conversely, the polymerization degree is decreased and a polymer having desired physical properties may not be obtained.

Next, in step 3), when the internal temperature of the reactor reaches the initial target polymerization temperature, the temperature is lowered at a certain cooling rate until the polymerization reaction is completed.

The present invention is characterized in that from the time when the internal temperature of the reactor reaches the initial target polymerization temperature, the temperature is lowered at a certain cooling rate without an isothermal interval until the polymerization is completed.

In the present invention, the initial target polymerization temperature is raised, and the temperature is lowered at a certain cooling rate without an isothermal interval from the time when the temperature reaches the initial target polymerization temperature, so that a heating phenomenon concentrated on a middle stage of polymerization and later may be distributed to an initial stage of the polymerization to thereby secure heat removal allowance, an increased amount of polymerization initiator may be added, and an effect of polymerization time reduction and polymerization productivity improvement may be achieved.

In this case, regarding the cooling rate, a desirable cooling rate may be determined according to the target average polymerization degree, the initial target polymerization temperature, and the amount of initiator to be added, and the like. For example, the cooling rate may be 0.02-0.2° C./minute, and the temperature may be lowered from the time when the temperature reaches the initial target polymerization temperature, while maintaining the certain cooling rate, until the polymerization reaction is completed.

More specifically, in an embodiment of the present invention, the desirable cooling rate may be described by using Equation 1 below.

$$\text{Cooling rate (° C./minute)} = \frac{2 \times (T - Ts) + 1}{ts \times \left[ \frac{1}{\text{Exp}(0.3 \times \sqrt{I - Is})} + 1.8 \times \left(\frac{Ts}{T} - 1\right) \right]} \quad \text{[Equation 1]}$$

In Equation 1, T is the initial target polymerization temperature (° C.), Ts is the isothermal polymerization reference temperature (° C.), I is the added amount of polymerization initiator (wt % with respect to 100 wt % of vinyl chloride-based monomer), Is is the added amount of polymerization initiator during isothermal polymerization, and is is the isothermal polymerization time (minute).

In this case, in Equation 1, T−Ts may be greater than 0 (T−Ts>0). That is, as described above, the initial target polymerization temperature (T) may be set higher than the isothermal polymerization reference temperature according to the average polymerization degree, the decomposition of the polymerization initiator during the initial stage of the polymerization may be promoted, and accordingly, the heating problem concentrated on the middle stage of polymerization or later may also be solved.

Also, in Equation 1, I−Is may be greater than 0 (I−Is>0). That is, since the decomposition of the polymerization initiator during the initial stage of the polymerization may be promoted by raising the initial target polymerization temperature, a heating amount during the final stage of the polymerization may decrease, and accordingly, the amount of polymerization initiator to be added may be increased. Accordingly, polymerization productivity may be improved by adding the polymerization initiator in an amount more than the existing limit value.

A cooling rate according to the present invention may be within a range of the cooling rate obtained through Equation 1 above ±0.01 (° C./minute).

The polymerization degree is a factor greatly affecting a processing condition and a physical property of a product and is determined according to a polymerization reaction temperature. Preparing a vinyl chloride-based polymer when the cooling rate is within the above range is desirable, and the vinyl chloride-based polymer, which has a physical property equal to or higher than that of the vinyl chloride-based polymer prepared through the existing isothermal polymerization, may be prepared.

When the cooling rate is 0.01 (° C./minute) or more slower than that obtained through Equation 1 above, polymerization is carried out at too high temperature, and thus, the average polymerization degree of the polymer may thereby be lower than the desired polymerization degree. In addition, When the cooling rate is 0.01 (° C./minute) or more faster than that obtained through Equation 1 above, polymerization is carried out too much at too high temperature, and thus, the average polymerization degree of the polymer may unfavorably be higher than the desired polymerization degree.

The polymerization reaction of the vinyl chloride-based polymer according to an embodiment of the present invention may be continued until a final stage polymerization temperature satisfies the range of the final stage polymerization temperature according to Equation 2±1° C.

$$\text{Final stage polymerization temperature} = T - \{2 \times (T - Ts) + 1\} \quad \text{[Equation 2]}$$

In Equation 2, T is the initial target polymerization temperature (° C.), and Ts is the isothermal polymerization reference temperature (° C.).

At the time when the final stage polymerization temperature reaches the final stage polymerization temperature according to Equation 2, the polymerization is stopped, unreacted monomers are recovered, and then, the polymerization is completed. Via dehydration and drying processes of obtained slurry, a final vinyl chloride-based polymer may be obtained.

The vinyl chloride-based polymer prepared according to the present invention may be variously used for soft PVC, general purpose PVC, hard PVC, or the like by adding a plasticizer thereto, if necessary.

Hereinafter, exemplary embodiments of the present invention will be described in detail so as to be easily implemented by those skilled in the art. The present disclosure may, however, be embodied in different forms and should not be construed as limited to the embodiments described herein.

Example 1

In a stainless-steel reactor with the inner volume of 1 m$^3$ to which a reflux condenser and a stirrer were attached, 140 parts by weight of water, 0.05 parts by weight of polyvinyl alcohol with a hydration degree of 72%, 0.015 parts by weight of polyvinyl alcohol with a hydration degree of 55%, 0.005 parts by weight of hydroxypropylmethyl cellulose, 0.120 parts by weight of t-butylperoxy neodecanonate (BND) were added, the inside of the reactor was deaerated by a vacuum pump under stirring, and 100 parts by weight of vinyl chloride monomers were fed. The initial target polymerization temperature inside the reactor was set at 59° C., and then when the initial target polymerization temperature was reached, polymerization was continued while the temperature was lowered at a cooling rate of 0.031° C./minute calculated by Equation 1. At the time when the final stage polymerization temperature reached 54° C., polymerization was stopped. As an antioxidant agent, 0.05 parts by weight of triethylene glycol-bis-[3-(3-t-butyl-5-methyl-4-hydroxy phenyl)propionate] was added, unreacted monomers were then recovered, and then polymer slurry was recovered from the reactor. Slurry obtained as such was dried in a fluidized dryer through a general method and a vinyl chloride polymer was obtained.

Example 2

Except that an initial target polymerization temperature was set at 61° C., polymerization was performed at a cooling rate of 0.060° C./minute, and the polymerization was stopped when a final polymerization temperature reached 52° C., a vinyl chloride polymer was prepared by performing the same process as example 1.

Example 3

Except that an initial target polymerization temperature was set at 63° C., polymerization was performed at a cooling rate of 0.092° C./minute, and the polymerization was stopped when a final polymerization temperature reached 50° C., a vinyl chloride polymer was prepared by performing the same process as example 1.

Example 4

Except that 0.144 parts by weight of t-butylperoxy neo-decanonate (BND) was added as a polymerization initiator, and polymerization was performed at a cooling rate of 0.037° C./minute, a vinyl chloride polymer was prepared by performing the same process as example 1.

Example 5

Except that 0.144 parts by weight of t-butylperoxy neo-decanonate (BND) was added as a polymerization initiator, and polymerization was performed at a cooling rate of 0.071° C./minute, a vinyl chloride polymer was prepared by performing the same process as example 2.

Example 6

Except that 0.144 parts by weight of t-butylperoxy neo-decanonate (BND) was added as a polymerization initiator, and polymerization was performed at a cooling rate of 0.111° C./minute, a vinyl chloride polymer was prepared by performing the same process as example 3.

Example 7

Except that a cooling rate was set at 0.027° C./minute, a vinyl chloride polymer was prepared by performing the same process as example 4.

Example 8

Except that a cooling rate was set at 0.047° C./minute, a vinyl chloride polymer was prepared by performing the same process as example 4.

Example 9

Except that an initial target polymerization temperature was set at 65° C., polymerization was performed at a cooling rate of 0.156° C./minute, and the polymerization is stopped when a final polymerization temperature reached 48° C., a vinyl chloride polymer was prepared by performing the same process as example 1.

Comparative Example 1

Except that isothermal polymerization was performed by setting an isothermal polymerization reference temperature at 57° C., and the polymerization was stopped at the time when a pressure change reached a change of 1.52 kg/cm², a vinyl chloride polymer was prepared by performing the same process as example 1.

Comparative Example 2

Except that isothermal polymerization was performed by setting an isothermal polymerization reference temperature at 59° C., isothermal polymerization was further performed after lowering the temperature to reach 55° C. in 30 minutes when the polymerization time reached 65 minutes, and polymerization was stopped at the time when a pressure change reached a change of 1.52 Kg/cm², a vinyl chloride polymer was prepared by performing the same process as example 1.

The physical properties of the vinyl chloride polymers which were respectively prepared in examples 1 to 9, and comparative examples 1 to 2 were respectively measured as the following, and the result thereof is shown in Table 1.

(1) Average particle diameter
Measured according to ASTM 1921.
(2) Apparent specific gravity
Measured according to ASTM D1895.
(3) Plasticizer adsorption rate
According to ASTM D 3367-95, the amount of DOP adsorbed onto a sample was expressed and measured in wt % with respect to the weight of a sample before the adsorption.
(4) Polymerization degree
Measured according to ASTM D1243.
(5) Polymerization time
The time from the addition of the initiator to the completion of a reaction was measured.

TABLE 1

|  | Initial temperature (° C.) | Initiator added amount (parts by weight) | Cooling rate (° C./minute) | Average particle diameter (μm) | Apparent specific gravity (g/cm³) | Plasticizer adsorption rate (wt %) | Polymerization degree | Polymerization time (minute) |
|---|---|---|---|---|---|---|---|---|
| Example 1 | 59 | 0.120 | 0.031 | 164 | 0.574 | 14.1 | 1000 | 160 |
| Example 2 | 61 | 0.120 | 0.060 | 166 | 0.579 | 13.5 | 1000 | 151 |

TABLE 1-continued

| | Initial temperature (° C.) | Initiator added amount (parts by weight) | Cooling rate (° C./minute) | Average particle diameter (μm) | Apparent specific gravity (g/cm³) | Plasticizer adsorption rate (wt %) | Polymerization degree | Polymerization time (minute) |
|---|---|---|---|---|---|---|---|---|
| Example 3 | 63 | 0.120 | 0.092 | 162 | 0.575 | 13.7 | 995 | 141 |
| Example 4 | 59 | 0.144 | 0.037 | 165 | 0.578 | 13.6 | 1005 | 135 |
| Example 5 | 61 | 0.144 | 0.071 | 163 | 0.575 | 13.4 | 1000 | 126 |
| Example 6 | 63 | 0.144 | 0.111 | 166 | 0.585 | 13.3 | 990 | 116 |
| Example 7 | 59 | 0.144 | 0.027 | 164 | 0.578 | 13.4 | 965 | 130 |
| Example 8 | 59 | 0.144 | 0.047 | 162 | 0.581 | 13.2 | 1030 | 145 |
| Example 9 | 65 | 0.144 | 0.156 | 173 | 0.567 | 15.3 | 950 | 110 |
| Comparative example 1 | 57 | 0.120 | — | 167 | 0.583 | 13.2 | 1000 | 170 |
| Comparative example 2 | 59 | 0.120 | 0.133 | 170 | 0.579 | 13.5 | 1000 | 165 |

As shown in Table 1, compared to comparative example 1 using isothermal polymerization for preparation, examples 1 to 9 exhibited an effect of reducing the polymerization time.

Specifically, in examples 1 to 3, although the same amount of polymerization initiator as that in comparative example 1 was added, the polymerization time was reduced, and thus, polymerization productivity was improved, and physical properties of the polymer such as a polymerization degree were shown to be the same or somewhat improved level. In particular, the higher the initial target polymerization temperature, the greater the effect of reducing the polymerization time.

Examples 4 to 6 are the cases in which since a heat removal allowance is secured, the polymerization initiator was added in a greater amount than that in the isothermal polymerization, and accordingly, the polymerization time is further reduced than examples 1 to 3, and the physical properties of polymers such as a polymerization degree was still shown to be the same.

Meanwhile, examples 7 and 8 are the cases in which after an initial target polymerization temperature was reached, polymerization was carried out while the temperature was lowered at a certain cooling rate, but the cooling rate is 0.01° C./min or more slower or faster than the cooling rate obtained by Equation 1. As a result, there was an effect of reducing the polymerization time, but the polymerization degree somewhat deviated from the target of 1000 was shown.

In the case of example 9 in which an initial target polymerization temperature was raised up to 65° C., an effect of reducing polymerization time was unsatisfactory compared to example 6 in which polymerization was carried out while the initial target polymerization temperature is set at 63° C., but the resulting polymerization degree was shown to somewhat deviate from the target 1000. Accordingly, it may be understood that the initial target polymerization temperature is favorably 1-7° C. higher than the isothermal polymerization reference temperature.

Meanwhile, in the case of comparative example 2, a non-isothermal polymerization in which an isothermal interval was present was carried out and showed a result in which the effect of reducing the polymerization time is somewhat unsatisfactory compared to example 1 in which the initial target polymerization temperature was the same, and since the addition of an increased amount of polymerization initiator is difficult, the improvement of polymerization productivity had a limit.

So far, preferred examples of the present invention have been described in detail, but the scope of the present invention is not limited thereto. In addition, various changes and modified forms carried out by a person skilled in the art using a basic concept of the present invention defined in claims below should also be construed as within the scope of the present invention.

The invention claimed is:

1. A method for preparing a vinyl chloride-based polymer, the method comprising:
   1) adding vinyl chloride-based monomers, a polymerization initiator and water into a reactor;
   2) raising internal temperature of the reactor up to an initial target polymerization temperature; and
   3) lowering the internal temperature of the reactor with a constant cooling rate until stopping a polymerization reaction.

2. The method for preparing a vinyl chloride-based polymer of claim 1, wherein in step 3), the internal temperature of the reactor is lowered without an isothermal interval.

3. The method for preparing a vinyl chloride-based polymer of claim 1, wherein the initial target polymerization temperature is equal to or higher than a base temperature for an isothermal polymerization,
   wherein the base temperature for an isothermal polymerization is selected in accordance with targeted average polymerization degree.

4. The method for preparing a vinyl chloride-based polymer of claim 3, wherein the initial target polymerization temperature is 1-7° C. higher than the base temperature for an isothermal polymerization.

5. The method for preparing a vinyl chloride-based polymer of claim 3, wherein when the targeted average polymerization is 1,000, the base temperature for an isothermal polymerization is within a range of 56–58° C.

6. The method for preparing a vinyl chloride-based polymer of claim 3, wherein when the targeted average polymerization is 1,000, the initial target polymerization temperature is within a range of 59–64° C.

7. The method for preparing a vinyl chloride-based polymer of claim 1, wherein the cooling rate is 0.02-0.2° C./min.

8. The method for preparing a vinyl chloride-based polymer of claim 1, wherein the cooling rate in step 3) is within a range of a cooling rate according to Equation 1±0.01° C./min:

$$\text{Cooling rate (°C./minute)} = \frac{2 \times (T - Ts) + 1}{ts \times \left[\dfrac{1}{\operatorname{Exp}(0.3 \times \sqrt{I - Is})} + 1.8 \times \left(\dfrac{Ts}{T} - 1\right)\right]} \qquad \text{Equation 1}$$

wherein in Equation 1:

T is the initial target polymerization temperature (° C.);

Ts is base temperature for an isothermal polymerization (° C.);

I is added amount of the polymerization initiator (parts by weight with respect to 100 parts by weight of the vinyl chloride-based monomer);

Is is added amount of the polymerization initiator during the isothermal polymerization (parts by weight with respect to 100 parts by weight of the vinyl chloride-based monomer); and ts is an isothermal polymerization time (minutes), wherein the base temperature for an isothermal polymerization is selected in accordance with targeted average polymerization degree.

9. The method for preparing a vinyl chloride-based polymer of claim 8, wherein in Equation 1, T −Ts >0.

10. The method for preparing a vinyl chloride-based polymer of claim 8, wherein in Equation 1, I−Is>0.

11. The method for preparing a vinyl chloride-based polymer of claim 1, wherein the polymerization reaction is continued until a final stage polymerization temperature satisfies a range of a final stage polymerization temperature according to Equation 2 ±0.01° C.:

Equation 2

Final stage polymerization temperature (° C.)=T−{2×(T−Ts)+1} wherein in Equation 2:

T is the initial target polymerization temperature (° C.); and

Ts is base temperature for an isothermal polymerization (° C.), wherein the base temperature for an isothermal polymerization is selected in accordance with targeted average polymerization degree.

\* \* \* \* \*